(12) United States Patent
Wang et al.

(10) Patent No.: US 11,275,397 B2
(45) Date of Patent: Mar. 15, 2022

(54) POWER FACTOR CORRECTION CIRCUIT, CONTROL METHOD AND CONTROLLER

(71) Applicant: Silergy Semiconductor Technology (Hangzhou) LTD, Hangzhou (CN)

(72) Inventors: Zhaofeng Wang, Hangzhou (CN); Xiaodong Huang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 2 days.

(21) Appl. No.: 16/882,605

(22) Filed: May 25, 2020

(65) Prior Publication Data

US 2020/0379495 A1 Dec. 3, 2020

(30) Foreign Application Priority Data

May 31, 2019 (CN) .......................... 201910470685.9

(51) Int. Cl.
*G05F 1/70* (2006.01)
*H02M 1/12* (2006.01)
*H02M 1/42* (2007.01)

(52) U.S. Cl.
CPC ................ *G05F 1/70* (2013.01); *H02M 1/12* (2013.01); *H02M 1/4225* (2013.01)

(58) Field of Classification Search
CPC .......... G05F 1/70; G01R 21/006; H02M 1/12; H02M 1/4208
See application file for complete search history.

(56) References Cited

U.S. PATENT DOCUMENTS

| | | | |
|---|---|---|---|
| 6,756,771 B1 | 6/2004 | Ball et al. | |
| 7,123,494 B2 | 10/2006 | Turchi | |
| 7,313,007 B2 | 12/2007 | Wu et al. | |
| 8,674,544 B2 | 3/2014 | Rada et al. | |
| 8,736,236 B2 | 5/2014 | Sun et al. | |
| 9,246,381 B2 | 1/2016 | Xu | |
| 9,692,294 B2 | 6/2017 | Jiang et al. | |
| 10,193,439 B2 | 1/2019 | Wang et al. | |
| 10,396,655 B2 | 8/2019 | Zhao et al. | |
| 2006/0119337 A1 | 6/2006 | Takahashi et al. | |
| 2010/0246226 A1 | 9/2010 | Ku et al. | |
| 2011/0221402 A1 | 9/2011 | Park et al. | |
| 2013/0043847 A1 | 2/2013 | Kim | |
| 2014/0063873 A1* | 3/2014 | Acker ...................... | H02M 1/12 363/40 |
| 2014/0160815 A1 | 6/2014 | Jeong et al. | |
| 2015/0023067 A1 | 1/2015 | Terasawa | |

(Continued)

FOREIGN PATENT DOCUMENTS

CN 106849639 A 6/2017

*Primary Examiner* — Kyle J Moody
*Assistant Examiner* — Lakaisha Jackson (57) ABSTRACT

A power factor correction circuit includes a power meter configured to measure a total harmonic distortion (THD) and an amplitude ratio of each harmonic component at an input port; a switching-type regulator that is controllable by a switch control signal in order to adjust a power factor; and a controller configured to generate the switch control signal to control the switching-type regulator to perform power factor correction, where the controller decreases the THD by adjusting a current reference signal according to the measured THD and the amplitude ratio of each harmonic component.

16 Claims, 10 Drawing Sheets

(56) References Cited

U.S. PATENT DOCUMENTS

| | | |
|---|---|---|
| 2016/0065054 A1 | 3/2016 | Li et al. |
| 2016/0190912 A1 | 6/2016 | Lim et al. |
| 2017/0181234 A1 | 6/2017 | Huang et al. |
| 2017/0250620 A1 | 8/2017 | White et al. |
| 2018/0269779 A1* | 9/2018 | Wang ................ H02M 1/12 |
| 2019/0252881 A1* | 8/2019 | Kono ................ H02M 7/48 |

* cited by examiner

FIG. 10

POWER FACTOR CORRECTION CIRCUIT, CONTROL METHOD AND CONTROLLER

RELATED APPLICATIONS

This application claims the benefit of Chinese Patent Application No. 201910470685.9, filed on May 31, 2019, which is incorporated herein by reference in its entirety.

FIELD OF THE INVENTION

The present invention generally relates to the field of power electronics, and more particularly to power factor correction circuits, control methods, and controllers.

BACKGROUND

A power factor (PF) is expressed by a cosine function of a phase difference between a voltage and a current. The power factor may also be expressed by a ratio of an active power to an apparent power. The power factor may be used for characterizing an electrical efficiency of an electrical device, whereby a low power factor represents a low electrical efficiency. A phase difference between a voltage and a current may be eliminated or reduced by performing a power factor correction (PFC) operation, in order to improve a power factor of a system, such that a transmission efficiency of active power is increased, and a grid environment is improved.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In an active PFC circuit, a fast adjustment is generally performed on an input current in a closed-loop control manner, such that the input current of the PFC circuit can track a sine alternating-current input voltage in real time, thereby performing power factor correction. A high demand on the power factor correction regarding a total harmonic distortion (THD) has been imposed by the current industries. In addition to a demand on the THD in an overloading condition, a demand on the THD in a half-loading condition and even a light-loading condition is also imposed, which has approximately the same specification as that in the overloading condition. In one solution for reducing the total harmonic distortion, a theoretical analysis is generally performed on factors affecting a total harmonic distortion indicator, in order to provide a compensation control strategy based on an established model. However, this solution may only be applicable under specific conditions.

Harmonic distortion indicates that an output signal includes other harmonic component than an input signal due to a nonlinear element in a system. THD is defined as a square root of a square sum of a ratio of an effective value $G_n$ of each harmonic component to an effective value $G_1$ of a fundamental component within a certain order; that is, $$THD = \sqrt{\sum_{n=2}^{H}\left(\frac{G_n}{G_1}\right)^2}.$$

When the THD of a device is too high, wave distortion may be caused to a voltage and a current in a power network, which can affect a normal operation of other devices in the power network. In an active power factor correction (PFC) circuit, an input current may include a high-order harmonic component due to a nonlinear element in the circuit. In order to not affect the operation of the power network, it may be required to reduce the THD.

In one embodiment, a power factor correction circuit can include: (i) a power meter configured to measure a THD and an amplitude ratio of each harmonic component at an input port; (ii) a switching-type regulator that is controllable by a switch control signal in order to adjust a power factor; and (iii) a controller configured to generate the switch control signal to control the switching-type regulator to perform power factor correction, where the controller decreases the THD by adjusting a current reference signal according to the measured THD and the amplitude ratio of each harmonic component.

Figure 1:
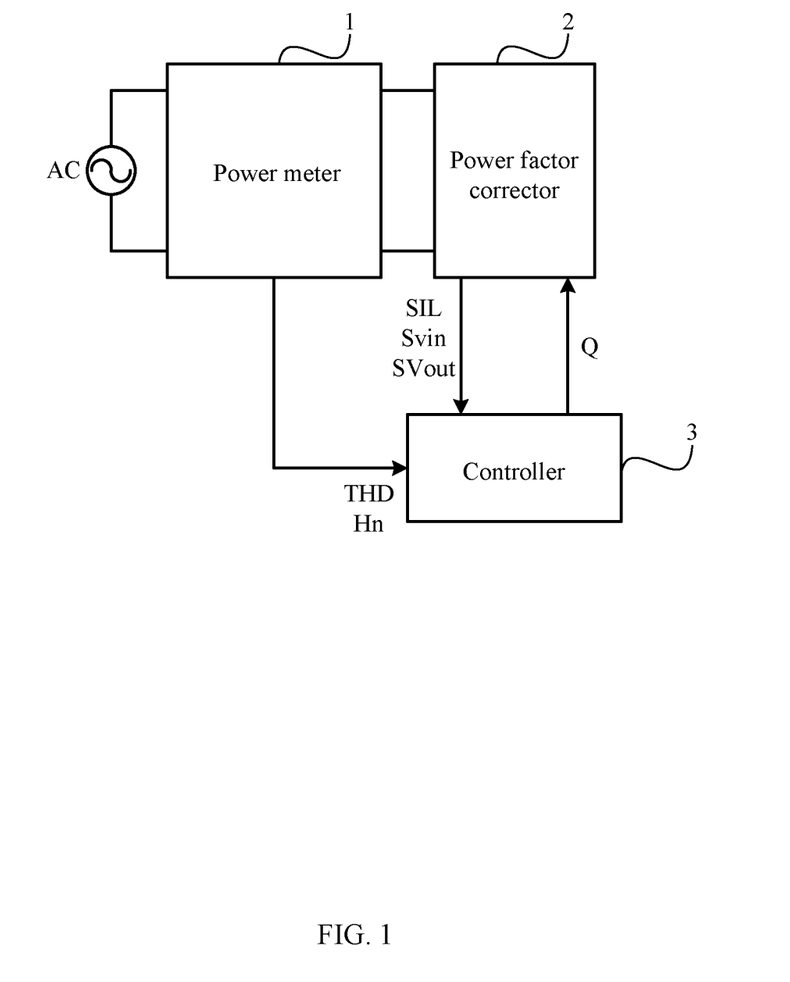
FIG. 1 is a schematic block diagram of an example power factor correction circuit, in accordance with embodiments of the present invention.

Referring now to FIG. 1 is a schematic block diagram of an example power factor correction circuit, in accordance with embodiments of the present invention. In this particular example, the power factor correction circuit can include a power meter 1, power factor corrector 2 and controller 3. Power meter 1 and power factor corrector 2 form a power stage circuit of the power factor correction circuit.

Figure 2:
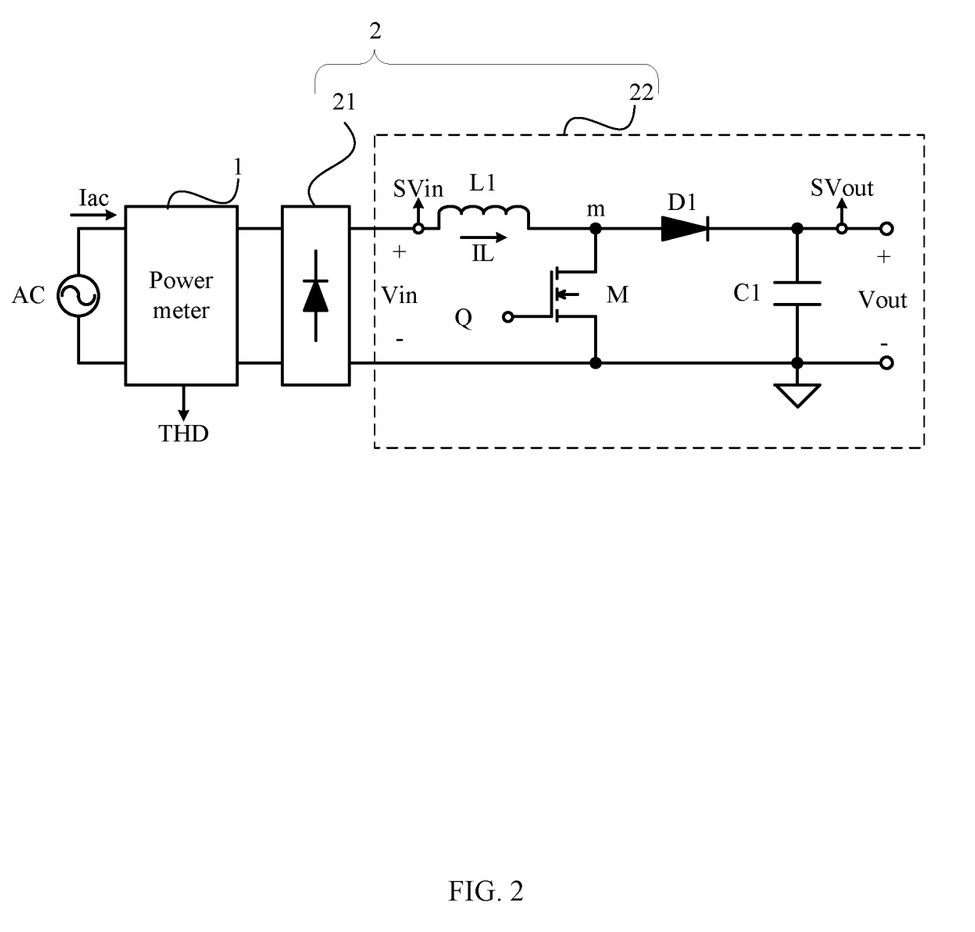
FIG. 2 is a schematic block diagram of an example power stage circuit of an example power factor correction circuit, in accordance with embodiments of the present invention.

Referring now to FIG. 2, shown is a schematic block diagram of an example power stage circuit of an example power factor correction circuit, in accordance with embodiments of the present invention. In this particular example, power factor corrector 2 can include rectifier circuit 21 and switching-type regulator 22. Rectifier circuit 21 can convert alternating current Iac input from input source AC into a direct current. Rectifier circuit 21 can be implemented by any suitable rectifier circuit, such as a half bridge rectifier circuit or a full bridge rectifier circuit. Switching-type regulator 22 can perform power factor correction in response to switch control signal Q. In FIG. 2, switching-type regulator 22 with a boost topology is shown; however, switching-type regulator 22 can additionally or alternatively have other topologies (e.g., a buck topology, a buck-boost topology, a flyback topology, etc.). In this particular example, switching-type regulator 22 can include inductor L1 for storing energy, switch M, diode D1, and capacitor C1. Inductor L1 can connect between an input port and middle terminal m. Switch M can connect between middle terminal m and a grounded terminal. Diode D1 configured to rectify an inductor current can connect between middle terminal m and an output terminal. Capacitor C1 configured to filter an output voltage can connect between the output terminal and the ground terminal. Switch M can be switched on/off in response to switch control signal Q, to control an inductor current, in order to actively correct a power factor.

For example, in order to reduce the THD, the power stage circuit can also include multiple sampling circuits to sample input voltage Vin, output voltage Vout, and inductor current IL of switching-type regulator 22, and output input voltage sampling signal SVin, output voltage sampling signal SVout, and inductor current sampling signal SIL. Each of the above sampling signals may be transmitted to controller 3 for generating switch control signal Q. In addition, power meter 1 can connect to an input port of power factor corrector 2, and can measure the THD and an amplitude ratio Hn of each harmonic component at the input port. The measured THD and the measured amplitude ratio of each harmonic component at the input port may also be transmitted to controller 3 for generating switch control signal Q.

Controller 3 can generate switch control signal Q based on input voltage sampling signal SVin, output voltage sampling signal SVout, inductor current sampling signal SIL, measured total harmonic distortion THD, and measured amplitude ratio Hn of each harmonic component, in order to control switching-type regulator 22. For example, controller 3 can control the inductor current of switching-type regulator 22 to be relatively close to a current reference signal, and the current reference signal represents an expected inductor current. Inductor current reference signal SIL can characterize an average value, a peak value, or a real-time variation value of inductor current IL. Controller 3 may adjust the current reference signal based on the measured total harmonic distortion THD and the measured amplitude ratio Hn of the harmonic component, in order to minimize the THD while performing the power factor correction. In particular embodiments, controller 3 can perform a digital control strategy to generate switch control signal Q. That is, controller 3 may input measured total harmonic distortion THD into a control loop, in order to generate switch control signal Q in a closed-loop control manner for minimizing the THD. Therefore, the current reference signal may be adjusted based on the measured THD and the measured amplitude ratio of each harmonic component, to minimize the THD while performing power factor correction, such that the total harmonic distortion can be reduced without, e.g., performing compensation design for a category of factors affecting THD indicators, thereby simplifying the control method.

As described above, the harmonic distortion indicates that an output signal includes other harmonic component compared with an input signal due to a nonlinear element in a system. Since an alternating current input to a power stage circuit of a power factor correction circuit is a periodic signal, the periodic signal can be analyzed as a superimposition of a direct-current signal and sinusoidal signals with different frequencies by Fourier analysis. Here, each harmonic component is a sinusoidal signal and the frequency of the harmonic component is multiple times that of the sinusoidal signal. Therefore, at least one predetermined harmonic component with the same effective value and an opposite phase compared with each harmonic component of the periodic signal can be superimposed (that is, opposite superimposition) on the periodic signal to counteract each harmonic component, thereby reducing the THD. For example, an amplitude ratio of one of the at least one predetermined harmonic component can be set based on the amplitude ratio Hn of a corresponding harmonic component of the input signal measured by power meter 1, and then a phase of each predetermined harmonic component may be adjusted to minimize the THD, thereby achieving an same effect of oppositely superimposing the harmonic component with the same effective value.

Further, the inductor current of switching-type regulator 22 may be substantially the same as a current of the inputted alternating signal; that is, IL=Iac. In addition, controller 3 can include a current control loop to control inductor current IL to be relatively close to current reference signal Iref. Therefore, at least one predetermined harmonic component can be superimposed on current reference signal Iref to adjust current reference signal Iref, in order to adjust inductor current IL, thereby counteracting unnecessary harmonic components in the inputted alternating current, and thus reducing or minimizing the THD.

In particular embodiments, even harmonic components (e.g., a second harmonic component, a fourth harmonic component, etc.) may be counteracted during rectification due to symmetrical phases. Therefore, only performing opposite superimposition on odd harmonic components can greatly reduce the total harmonic distortion. However, it should be understood that opposite superimposition may be performed on both the even harmonic components and the odd harmonic components, in order to reduce the total harmonic distortion even more accurately; however, this may cause increased computational complexity.

The one or more predetermined harmonic component can be set by a system designer/user. For example, controller 3 may be configured to perform compensation only on a third harmonic component of the input signal. For example, the amplitude ratio of a predetermined third harmonic component can be set based on amplitude ratio H3 of the third harmonic component of the input signal measured by power meter 1, and a phase of the predetermined third harmonic component may be adjusted, such that the predetermined third harmonic component has a phase opposite to that of the third harmonic component of the input signal. When the input signal also includes a fifth harmonic component or a seventh harmonic component, compensation may be not performed on the fifth harmonic component and the seventh harmonic component of the input signal. In such a case, the system may have a relatively low complexity and a fast reaction speed.

For example, controller 3 can also perform compensation on a third harmonic component, a fifth harmonic component, a seventh harmonic component, a ninth harmonic component of the input signal, and so on. When the input signal only includes a fifth harmonic component and a seventh harmonic component, based on amplitude ratio Hn of each harmonic component of the input signal measured by power meter 1, amplitude ratios of predetermined third harmonic component and ninth harmonic component can be set to be zero, and amplitude ratios of predetermined fifth harmonic component and seventh harmonic component can be set to not be zero. In addition, phases of the predetermined fifth harmonic component and seventh harmonic component may be adjusted, such that the predetermined fifth harmonic component and seventh harmonic component have phases respectively opposite to that of the fifth harmonic component and the seventh harmonic component of the input signal. Thus, multiple harmonic components of the input signal can have compensation performed thereon.

In particular embodiments, the measured total harmonic distortion may be input into the control loop, to determine a phase of each predetermined harmonic component, such that the phase of each predetermined harmonic component is opposite to the phase of a corresponding harmonic component of the input signal. For example, controller 3 can adjust, after setting the amplitude ratio of each predetermined harmonic component based on the amplitude ratio Hn of a corresponding harmonic component of the input signal measured by power meter 1, the phase of each predetermined harmonic component based on the measured total harmonic distortion in order to minimize the total harmonic distortion.

Figure 3:
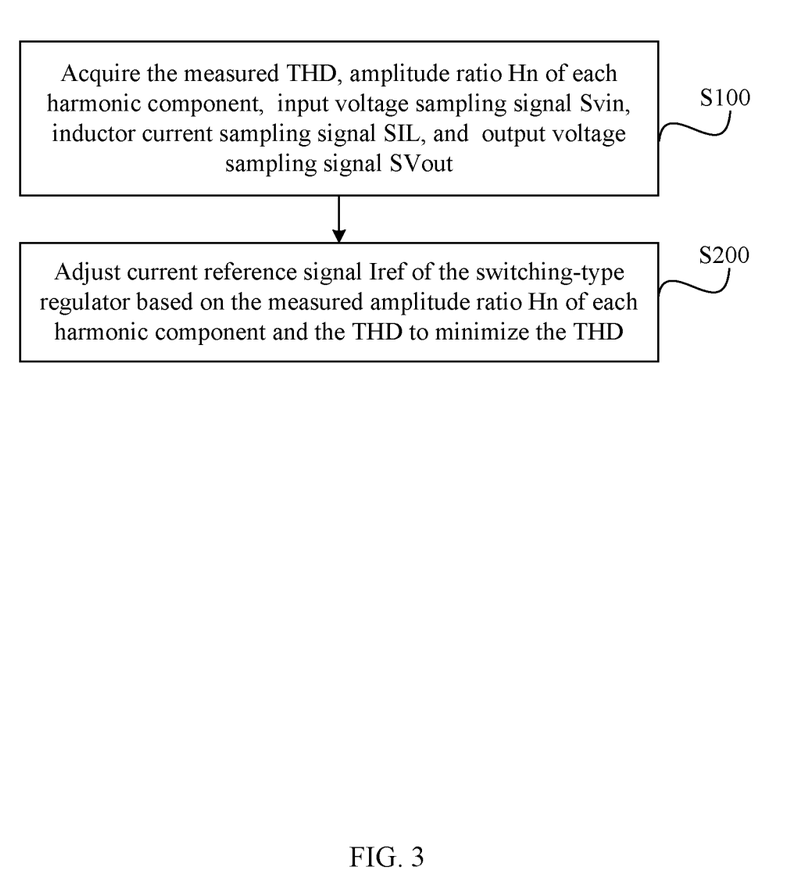
FIG. 3 is a flow diagram of an example control method, in accordance with embodiments of the present invention.

Referring now to FIG. 3, shown is a flow diagram of an example control method, in accordance with embodiments of the present invention. In this particular example, in S100, a total harmonic distortion THD, an amplitude ratio Hn of each harmonic component, input voltage sampling signal SVin, an inductor current sampling signal SIL, and output voltage sampling signal SVout can be measured and acquired. In S200, current reference signal Iref can be adjusted based on amplitude ratio Hn of each predetermined harmonic component and the total harmonic distortion THD to minimize the total harmonic distortion THD. Further, in S200, power factor correction may also be performed in other control loops based on input voltage sampling signal SVin, the inductor current sampling signal SIL, and output voltage sampling signal SVout. For example, in S200, the total harmonic distortion THD can be minimized by setting an amplitude ratio of each predetermined harmonic component and adjusting a phase of each predetermined harmonic component.

Figure 4:
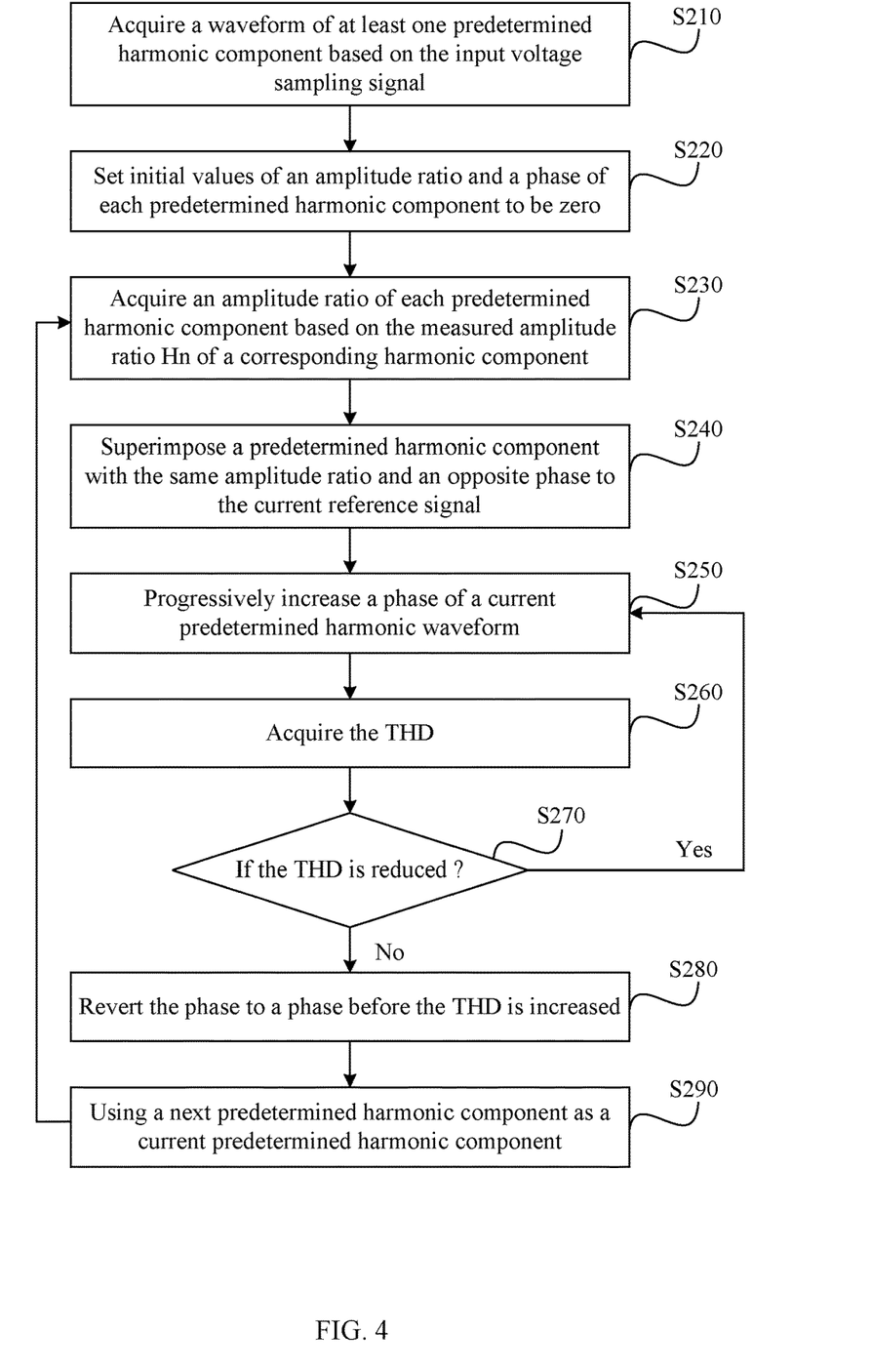
FIG. 4 is a flow diagram of a first example method for adjusting a phase of a harmonic component, in accordance with embodiments of the present invention.

Referring now to FIG. 4, shown is a flow diagram of a first example method for adjusting a phase of a harmonic component, in accordance with embodiments of the present invention. In this particular example, the phase of each predetermined harmonic component can be adjusted in a phase increasing manner. In S210, at least one predetermined harmonic component may be acquired based on the input voltage sampling signal. Since there may be multiple harmonic components in an input voltage, compensation may generally be performed on only one or more harmonic components with a frequency close to a fundamental frequency. The at least one predetermined harmonic components can be respectively ranked in advance, and an amplitude ratio of each predetermined harmonic component can be set in order based on the measured amplitude ratio Hn of corresponding harmonic components, and a phase of each predetermined harmonic component may be adjusted one-by-one.

In S220, initial values of the amplitude ratio and the phase of each predetermined harmonic component can be set to be zero. In S230, the amplitude ratio of each predetermined harmonic component may be acquired based on the measured amplitude ratio Hn of corresponding harmonic components. In S240, the predetermined harmonic component with the same amplitude ratio compared against the current reference signal may be superimposed to the current reference signal. For example, a predetermined harmonic component can be acquired. Then, the predetermined harmonic component may be multiplied by an amplitude ratio corresponding to the predetermined harmonic component to obtain a multiplied signal, and the multiplied signal can be superimposed on current reference signal Iref.

In S250, the phase of the predetermined harmonic component can be progressively increased. The phase of the predetermined harmonic component may be increased with a predetermined step length, or with changed increased amplitude, which may be calculated for every operation. In S260, the THD can again be measured after adjusting the current reference signal. In S270, whether the THD is reduced can be determined after progressively increasing the phase of the predetermined harmonic component. When the THD is reduced, the process can proceed to S250, to progressively increase the phase of the predetermined harmonic component. When the THD is not reduced, this may indicate that the phase of the predetermined harmonic component before performing the progressive increase operation is opposite to the phase of the harmonic component in the input signal. Then, the process may proceed to S280.

In S280, the phase of the predetermined harmonic component can be reverted to the phase before the THD was increased. In addition, the predetermined harmonic component having the phase before the THD is increased can be superimposed on the current reference signal. In S290, a next predetermined harmonic component may in turn be used as a current predetermined harmonic component, and the process can return to S230 to adjust the phase of the next predetermined harmonic component. In other cases, when the phase is relatively large, obtaining the phase of the predetermined harmonic component can be more difficult in order to minimize the THD.

Figure 5:
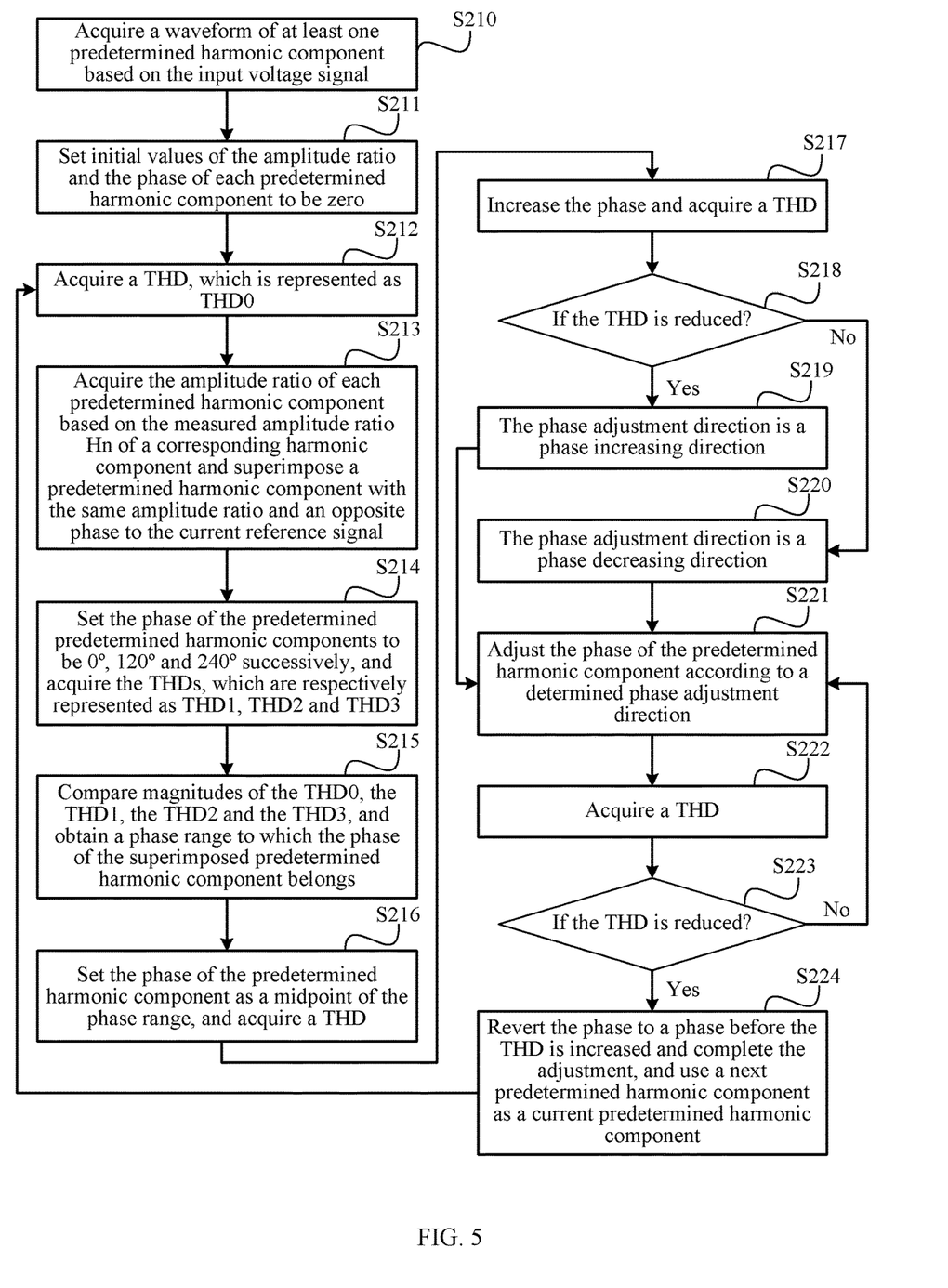
FIG. 5 is a flow diagram of a second example method for adjusting a phase of a harmonic component, in accordance with embodiments of the present invention.

Referring now to FIG. 5, shown is a flow diagram of a second example method for adjusting a phase of a harmonic component, in accordance with embodiments of the present invention. In this particular example, a phase of the predetermined harmonic component can be adjusted in a phase partitioned manner which can relatively easily obtain the phase of the predetermined harmonic component to minimize the THD. For example, in S210, at least one predetermined harmonic component may be acquired based on an input voltage sampling signal. Since there may be multiple harmonic components in an input voltage, compensation can generally be performed only on one or more harmonic components with a frequency close to a fundamental frequency. The at least one predetermined harmonic component(s) can be ranked in advance, and an amplitude ratio of each predetermined harmonic component may be set in order based on the measured amplitude ratio Hn of corresponding harmonic components, and a phase of each predetermined harmonic component can be adjusted one-by-one.

In S211, initial values of the amplitude ratio and the phase of each predetermined harmonic component may be set to be zero. In S212, a total harmonic distortion THD can be acquired, which is represented by THD0. In S213, the amplitude ratio of each predetermined harmonic component may be acquired based on the measured amplitude ratio Hn of corresponding harmonic components, and the predetermined harmonic component with the same amplitude ratio compared against the current reference signal can be superimposed to the current reference signal.

For example, the predetermined harmonic component can be acquired. Then, the predetermined harmonic component may be multiplied by the amplitude ratio corresponding to the predetermined harmonic component to obtain a multiplied signal, and the multiplied signal can be superimposed on the current reference signal Iref. In S214, the phase of the predetermined harmonic component may be set to be 0°, 120° and 240° successively, and the total harmonic distortions THD can be acquired, which are respectively represented by THD1, THD2, and THD3. In S215, magnitudes of the THD0, the THD1, the THD2, and the THD3 can be compared against each other, and a phase range to which the phase of the predetermined harmonic component belongs can accordingly be obtained.

For example, when the THD1, the THD2, and the THD3 are greater than THD0, this can indicate that it is unsuitable to perform compensation on a harmonic component of the input signal corresponding to the predetermined harmonic component (e.g., the input signal not including the harmonic component corresponding to the predetermined harmonic component). Magnitudes of the THD1, the THD2, and the THD3 may be compared against each other, and the phase range to which the phase of the predetermined harmonic component belongs can accordingly be obtained.

It is to be noted that there are various partition approaches in S214 and S215 that are supported in certain embodiments. In S216, the phase of the superimposed predetermined harmonic component can be set as a midpoint of a phase range and the total harmonic distortion THD can again be acquired. In S217, the phase can be increased and the total harmonic distortion THD may be acquired. In S218, whether the total harmonic distortion THD is reduced after increasing the phase can be determined. When the THD is reduced, this can indicate that a phase adjustment direction is a phase-increasing direction and the process may proceed to S219. When the THD is not reduced, this can indicate that a phase adjustment direction is a phase-decreasing direction and the process may proceed to S220.

In S219, the phase adjustment direction is the phase-increasing direction. In S220, the phase adjustment direction is the phase-decreasing direction. In S221, the phase of the predetermined harmonic component can continually be adjusted based on the determined phase adjustment direction. For example, when the phase adjustment direction is the phase-increasing direction, the current phase can progressively be increased. When the phase adjustment direction is the phase-decreasing direction, the current phase can progressively be decreased. In S222, the THD may be acquired.

In S223, whether the total harmonic distortion THD is reduced can be determined. When the total harmonic distortion THD is reduced, the process may proceed to S221, in order to adjust the phase of the predetermined harmonic component continually according to the determined phase adjustment direction. When the total harmonic distortion THD is not reduced, this can indicate that the phase of the predetermined harmonic component before the progressive increase operation is opposite to the phase of the corresponding harmonic component in the input signal, and therefore the process may proceed to S224.

In S224, the phase can be reverted to a phase before the THD is not increased, and the phase adjustment may be completed. The predetermined harmonic component having the phase before the total harmonic distortion is not increased can be superimposed on the current reference signal. A next harmonic component may in turn be used as a current predetermined harmonic component, and the process may return to S212 to adjust the phase of the next predetermined harmonic component.

As described above, for the predetermined harmonic components, an amplitude ratio of each predetermined harmonic component can be set based on the measured amplitude ratio Hn of corresponding harmonic components and the phase of each predetermined harmonic component may be adjusted in an one-by-one manner, such that the phase of the predetermined harmonic component may be opposite to the phase of a corresponding harmonic component in the input signal, thereby minimizing a THD. It is to be noted that, the adjusting of the phase of each predetermined harmonic component may be maintained during operation of a system, such that the THD of the system is reduced during the whole operation. It is to be noted that manners of adjusting a phase of each predetermined harmonic component are not limited to the above two examples. For example, a phase for minimizing the THD may also be acquired by continually increasing the phase within a phase range after phase partition. Any suitable approach for adjusting a phase of a predetermined harmonic component in order to minimize a THD can be supported in certain embodiments.

Figure 6:
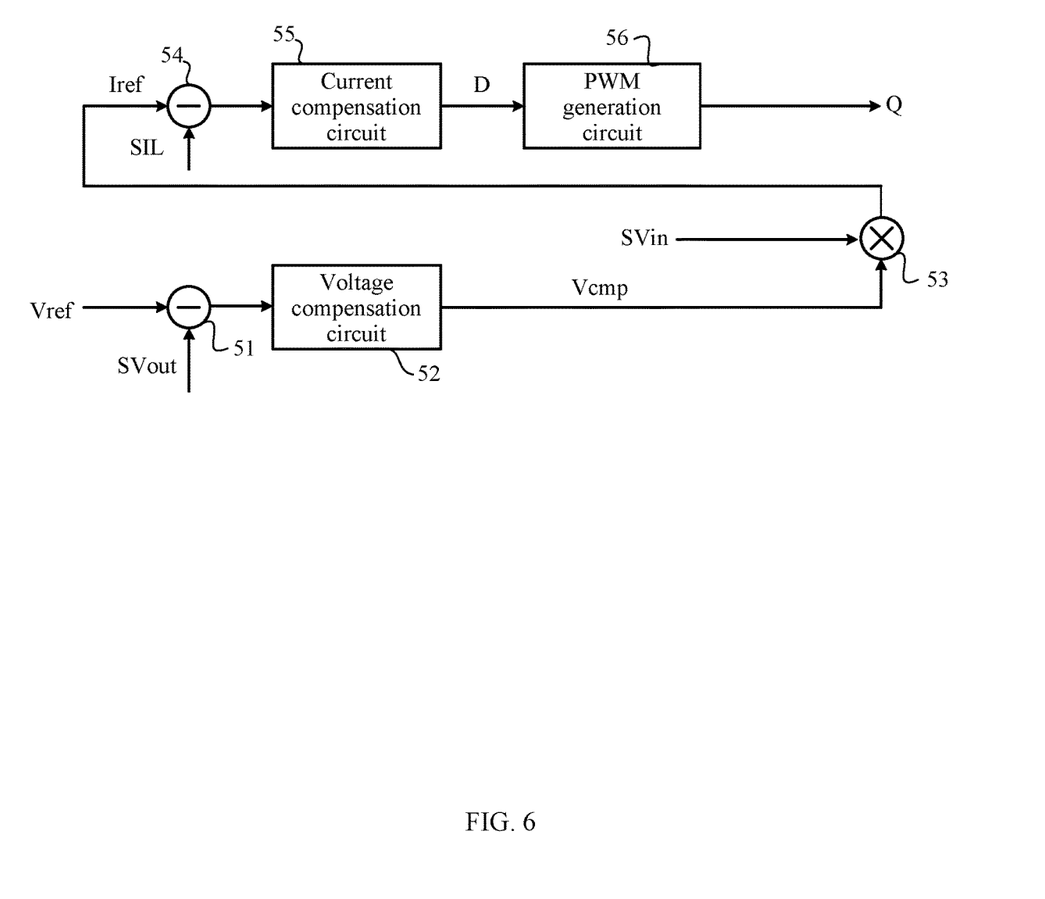
FIG. 6 is a diagram of an example data flow in a controller.

Referring now to FIG. 6, shown is a diagram of an example data flow in a controller. In this particular example, the controller can control inductor current IL in a closed-loop control manner. For example, the controller can control output voltage Vout by a voltage loop, and may control inductor current IL by a current loop. In this approach, a difference between output voltage sampling signal SVout and voltage reference signal Vref may be acquired by subtractor 51, and compensation signal Vcmp can be output from voltage compensation circuit 52. Compensation signal Vcmp may be multiplied by input voltage sampling signal Vin by multiplier 53. A product signal output from multiplier 53 may serve as current reference signal Iref and may be input to subtractor 54. Subtractor 54 can acquire a difference between current reference signal Iref and inductor current sampling signal SIL, and may output signal D for characterizing a desired duty ratio through current compensation circuit 55. PWM generation circuit 56 can generate switch control signal Q based on signal D for characterizing a desired duty ratio. However, this particular controller lacks a universal mechanism to compensate a total harmonic distortion of a circuit.

Figure 7:
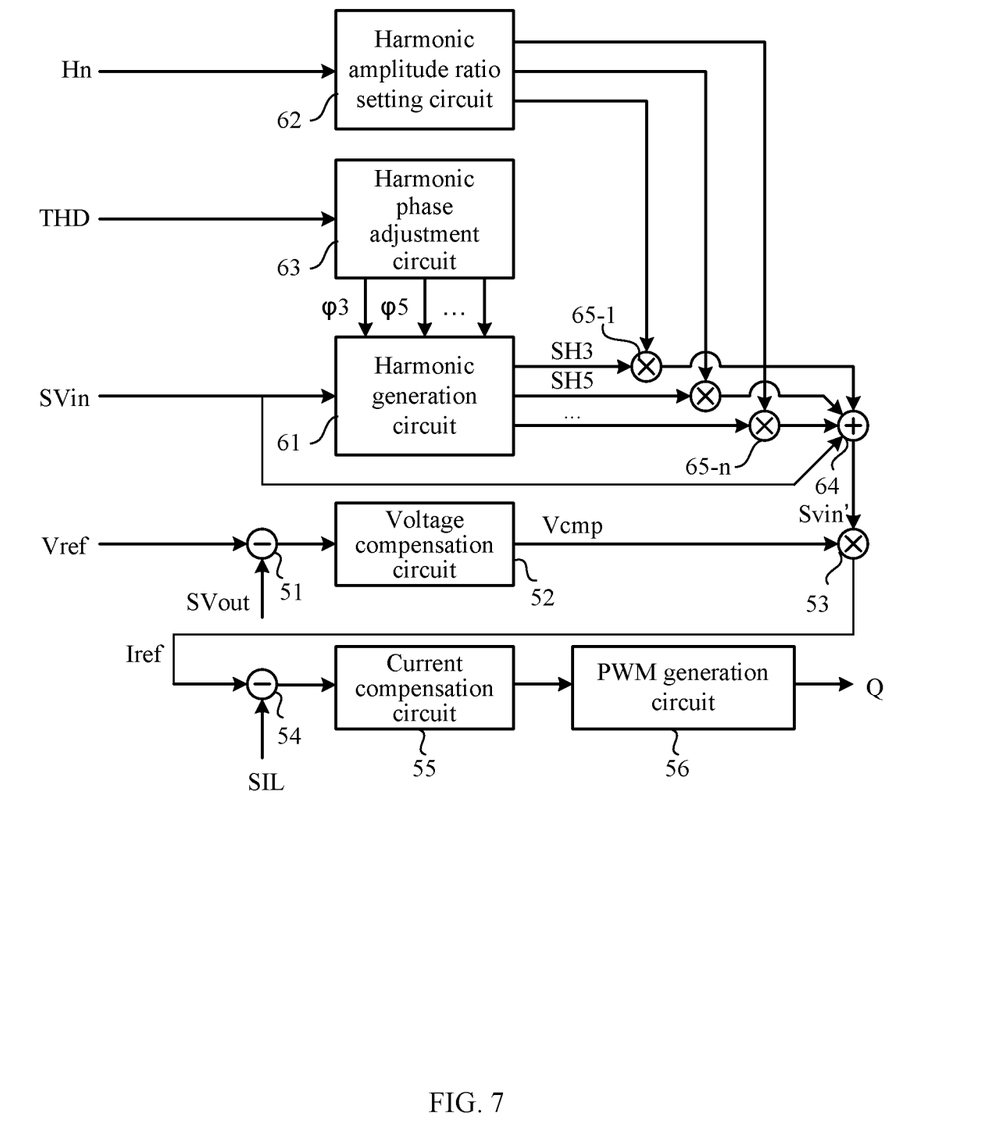
FIG. 7 is a diagram a first example data flow in a controller, in accordance with embodiments of the present invention.

Referring now to FIG. 7, shown is a diagram a first example data flow in a controller, in accordance with embodiments of the present invention. In this particular example, in addition to subtractor 51, voltage compensation circuit 52, multiplier 53, subtractor 54, current compensation circuit 55, and PWM generation circuit 56, the controller can also include harmonic generation circuit 61, harmonic amplitude ratio setting circuit 62, harmonic phase adjustment circuit 63, adder 64, and multipliers 65-1 to 65-$n$. For example, the number of the multipliers is equal to the number of the predetermined harmonic components. A difference between output voltage sampling signal SVout and voltage reference signal Vref may be acquired by subtractor 51. The difference can be input to voltage compensation circuit 52, and compensation signal Vcmp may be output from voltage compensation circuit 52. Harmonic amplitude ratio setting circuit 62 can set the amplitude ratio of each predetermined harmonic component based on the measured amplitude ratio Hn of corresponding harmonic components. Harmonic phase adjustment circuit 63 can output the phase of each predetermined harmonic component to harmonic generation circuit 61 based on the measured total harmonic distortion THD, and may adjust the phase to minimize the total harmonic distortion.

Harmonic generation circuit 61 can generate each predetermined harmonic component based on input voltage sampling signal SVin (e.g., third harmonic component SH3, fifth harmonic component SH5, etc.), and may adjust the phase of each predetermined harmonic component based on the phase outputted from harmonic phase adjustment circuit 63. The amplitude ratio of each predetermined harmonic component output from harmonic amplitude ratio setting circuit 62 may be multiplied by corresponding predetermined harmonic components with a phase outputted from harmonic generation circuit 61, respectively, in multipliers 65-1 to 65-$n$, in order to generate at least one voltage harmonic component. The voltage harmonic components corresponding to predetermined harmonic components may have the same amplitude ratio and the opposite phase with respect to corresponding harmonic components of the input signal. All voltage harmonic components can be superimposed on the input voltage sampling signal in adder 64 to acquire an output parameter SVin' (which is expressed by: SVin'=SVin+SH3*Ratio3+SH5*Ratio5+ ... ).

In the above equation, SVin' represents a parameter obtained after the voltage harmonic components are superimposed on the input voltage sampling signal, and Ratioi represents an amplitude ratio of an i-th predetermined harmonic component, which is set by harmonic amplitude ratio setting circuit 62 based on the amplitude ratio Hn of each harmonic component measured by the power meter. Also, SHi represents an i-th predetermined harmonic component with a phase, and SHi*Ratioi represents an i-th voltage harmonic component corresponding to the i-th predetermined harmonic component. Multiplier 53 can input the signal SVin' and compensation signal Vcmp, and may output a product signal of signal SVin' and compensation signal Vcmp as current reference signal Iref (which is expressed by: Iref=Vcmp*(SVin+SH3*Ratio3+SH5*Ratio5+ ... )=Vcmp*SVin+Vcmp*SH3*Ratio3+Vcmp*SH5*Ratio5+ ... ). That is, with the above setting, multiple predetermined harmonic components obtained based on an input voltage can be superimposed on current reference signal Iref to adjust current reference signal Iref.

Harmonic phase adjustment circuit 63 may adjust the phase of each predetermined harmonic component (e.g., with the example method as shown in FIG. 4 or FIG. 5) until the measured THD is no longer reduced. With the above control method, the phase of each predetermined harmonic component superimposed on current reference signal Iref can be opposite to the phase of corresponding harmonic components in the input signal, thereby controlling the inductor current to be close to current reference signal Iref to eliminate the harmonic component in the system, and thus minimizing the total harmonic distortion THD.

Figure 8:
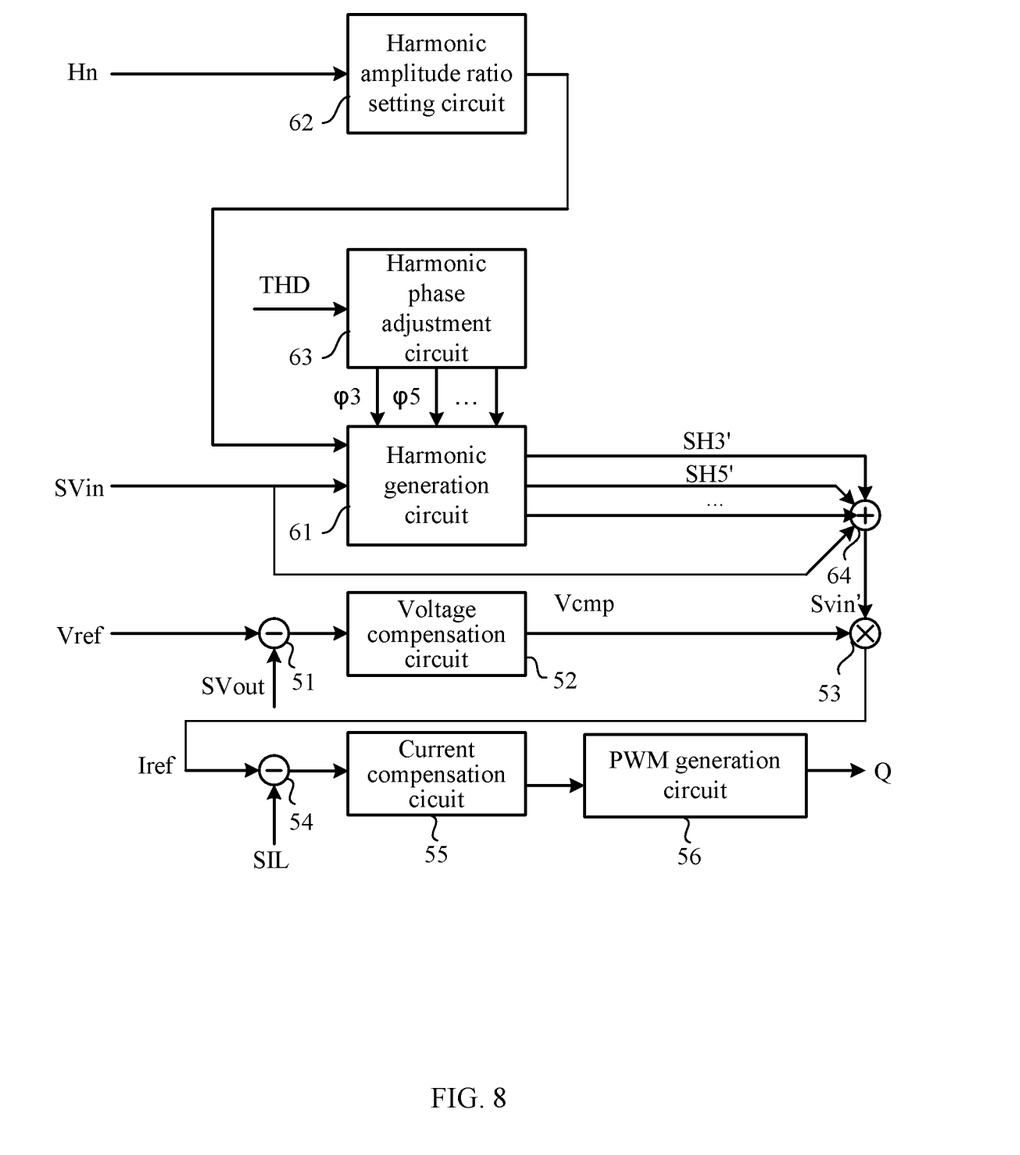
FIG. 8 is a diagram of a second example data flow in a controller, in accordance with embodiments of the present invention.

Referring now to FIG. 8, shown is a diagram of a second example data flow in a controller, in accordance with embodiments of the present invention. In addition to subtractor 51, voltage compensation circuit 52, multiplier 53, subtractor 54, current compensation circuit 55, and PWM generation circuit 56, the controller can also include harmonic generation circuit 61, harmonic amplitude ratio setting circuit 62, harmonic phase adjustment circuit 63, and adder 64. Harmonic generation circuit 61 can generate each predetermined harmonic component based on the input voltage sampling signal SVin (e.g., third harmonic component SH3, a fifth harmonic component SH5, etc.). Harmonic amplitude ratio setting circuit 62 can set, based on the measured corresponding amplitude ratio Hn of each harmonic component, the amplitude ratio of predetermined harmonic components generated by harmonic generation circuit 61.

After each predetermined harmonic component is multiplied by the amplitude ratio of corresponding predetermined harmonic components, harmonic phase adjustment circuit 63 can output a phase of each predetermined harmonic component to harmonic generation circuit 61 based on the measured total harmonic distortion THD and may adjust the phase to minimize the total harmonic distortion. At least one voltage harmonic component output from harmonic generation circuit 61 corresponding to at least one predetermined harmonic component may have the same amplitude ratio and an opposite phase with respect to corresponding harmonic components of the input signal. In this particular example, a phase can be adjusted after a product signal is obtained by multiplying each predetermined harmonic component by the corresponding amplitude ratio of each predetermined harmonic component.

In particular embodiments, the measured total harmonic distortion THD can be used for feedback, such that the total harmonic distortion can be directly adjusted in a closed-loop manner. In such a case, the total harmonic distortion can be reduced without performing compensation, e.g., for a category of factors affecting total harmonic distortion indicators, thereby simplifying the control method. In other examples, each component in the SVin' can be respectively multiplied by the Vcmp; that is, the SVin, the SH3*Ratio3, SH5*Ratio5 ... can be multiplied by the Vcmp respectively. Then, the obtained product signals can be added to obtain a sum signal, which may be used as the current reference signal Iref (that is, Iref=Vcmp*SVin+Vcmp*SH3*Ratio3+Vcmp*SH5*Ratio5+ ... ).

It should further be understood that above methods, processes, units, and circuits and/or modules may be implemented by physical circuits or components or embodied as code and/or data. The code and/or data may be stored on a readable storage medium. When reading and executing the above code and/or data, a processor performs the methods and processes embodied as data structures and code and stored on the readable storage medium. The controller as described herein may be implemented in various ways. For example, these techniques may be implemented in hardware, firmware, software, or a combination thereof. For a hardware implementation, the controller may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described in the present disclosure, or a combination thereof. For firmware or software implementation, the controller the present disclosure may be implemented by modules (e.g., procedures, functions) for performing the functions described herein. These software codes can be stored in a memory and executed by a processor. The memory may be implemented in the processor, or outside the processor. In the latter case, the memory may be communicatively connected to the processor in any suitable manner.

Figure 9:
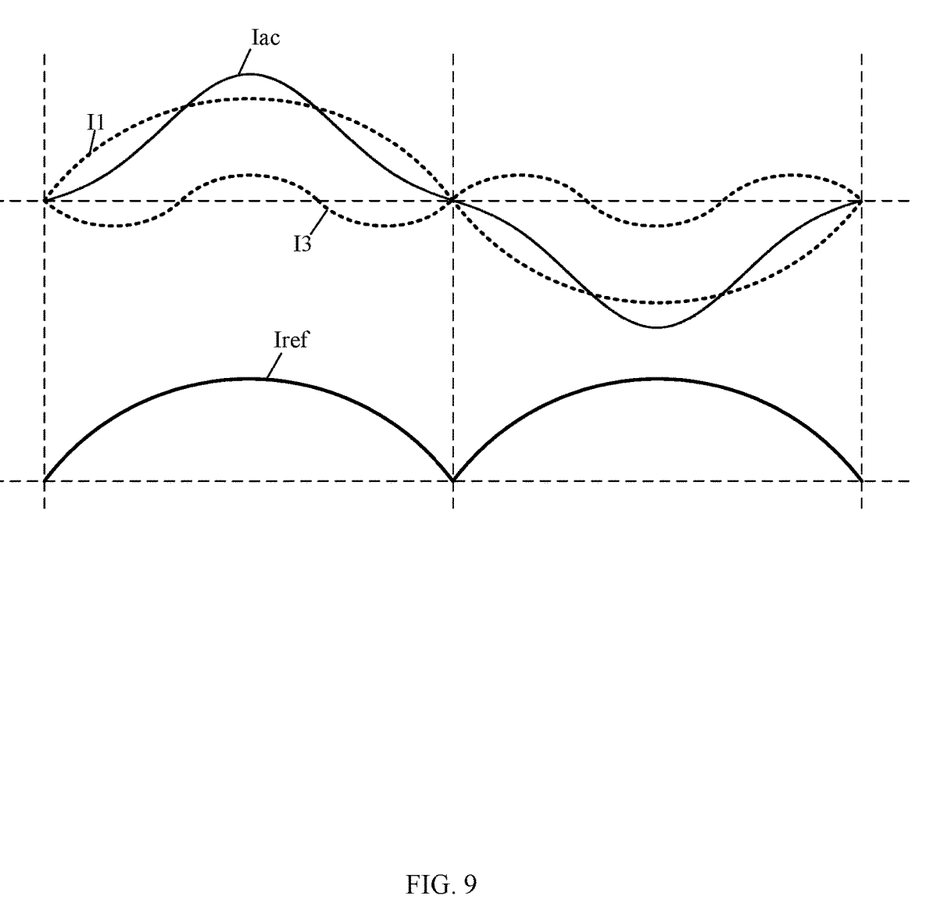
FIG. 9 is a waveform diagram of example operation of an example power factor correction circuit, in accordance with embodiments of the present invention.
Figure 10:
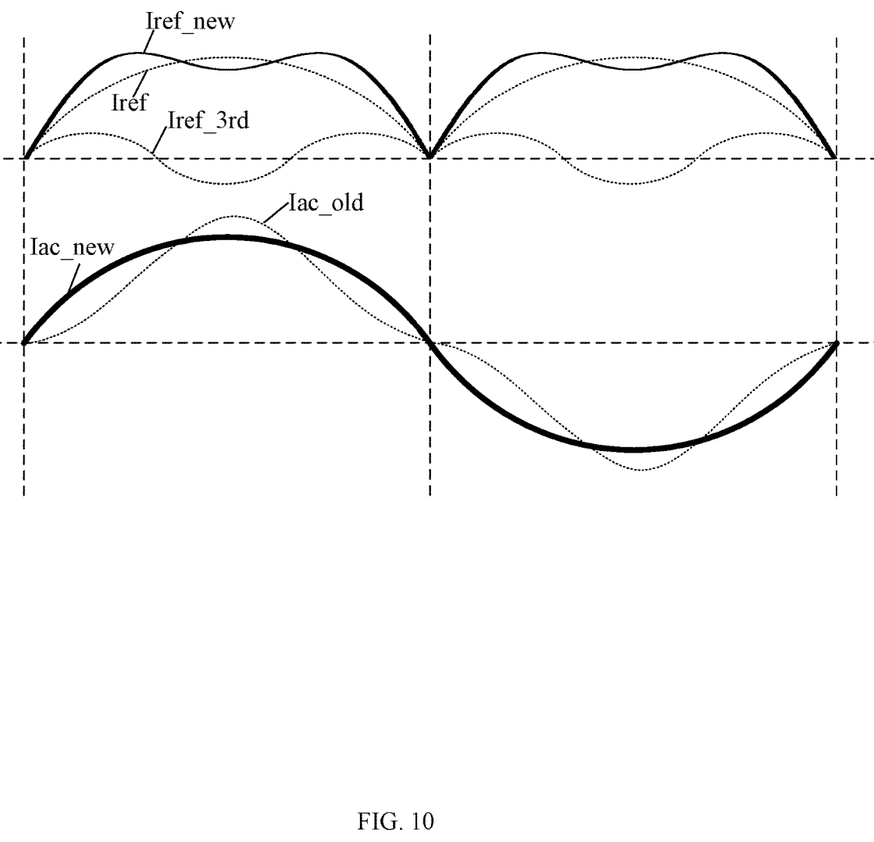
FIG. 10 is a waveform diagram of another example operation of an example power factor correction circuit, in accordance with embodiments of the present invention.

Referring now to FIG. 9, shown is a waveform diagram of example operation of an example power factor correction circuit, in accordance with embodiments of the present invention. Referring also to FIG. 10, shown is a waveform diagram of another example operation of an example power factor correction circuit, in accordance with embodiments of the present invention. In FIG. 9, because the total harmonic distortion of input alternating current Iac is 25%, and there is only a third harmonic component. Here, Iac represents a waveform of an input current of a power factor correction circuit, I1 represents a waveform of a fundamental current, and I3 represents a waveform of the third harmonic component, and Iac=I1+I3. When a system operates, a sinusoidal wave with the same phase and waveform as input voltage Vin of switching-type regulator 22 can be used as a current reference signal. In this particular example, the total harmonic distortion measured by the power meter 1 is 25%.

Controller 3 can acquire, based on a waveform of input voltage sampling signal SVin, a waveform of a third harmonic component of an input voltage (that is, a triple frequency sinusoidal signal) corresponding to the input voltage sampling signal. Further, controller 3 can superimpose the opposite third harmonic component Iref_3rd on the input voltage, and an obtained current reference signal Iref_new is as shown in FIG. 10. In addition, controller 3 can set an amplitude ratio of the third harmonic component according to the measure third harmonic component of the input signal, the phase of the third harmonic component may be adjusted based on a measured total harmonic distortion THD, and the phase can be adjusted until a minimum total harmonic distortion is obtained. After compensation is performed on the third harmonic component, a comparison of input current Iac_new obtained after the compensation was performed can be made to input current Iac_old before the compensation was performed. It can be seen that the third harmonic component of the input current can be substantially eliminated. When the predetermined harmonic component also includes a fifth harmonic component, a seventh harmonic component, etc., the adjustment process may be repeated in order to minimize the total harmonic distortion.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power factor correction circuit, comprising:
   a) a power meter configured to measure a total harmonic distortion (THD) and an amplitude ratio of each harmonic component at an input port;
   b) a switching-type regulator that is controllable by a switch control signal in order to adjust a power factor; and
   c) a controller configured to generate the switch control signal to control the switching-type regulator to perform power factor correction, wherein the controller decreases the THD by adjusting a current reference signal according to the measured THD and the amplitude ratio of each harmonic component; and
   d) wherein the controller is configured to adjust the current reference signal by superimposing at least one predetermined harmonic component on the current reference signal, and to adjust, based on the measured THD, a phase of each of the predetermined harmonic components to minimize the THD.

2. The power factor correction circuit of claim 1, wherein the controller is configured to:
   a) set, based on the measured amplitude ratio of a corresponding harmonic component, an amplitude ratio of the predetermined harmonic component; and
   b) adjust the phase of the predetermined harmonic component in a predetermined order until the measured THD is no longer decreased.

3. The power factor correction circuit of claim 2, wherein the phase of the predetermined harmonic component is adjusted by progressively increasing the phase from zero until the measured THD is no longer decreased.

4. The power factor correction circuit of claim 2, wherein phase partition is performed, a phase range where the phase of the predetermined harmonic component is located is determined, and the phase of the predetermined harmonic component is adjusted within the phase range until the measured THD is no longer decreased.

5. The power factor correction circuit of claim 4, wherein a midpoint of the phase range where the phase of the harmonic component is located is determined as a reference point, whether a phase adjustment direction is a phase increasing direction or a phase decreasing direction is determined, and the phase of the predetermined harmonic component is adjusted based on the determined phase adjustment direction from the reference point until the measured THD is no longer decreased.

6. The power factor correction circuit of claim 1, wherein the controller is configured to perform at least one of:
   a) superimposing at least one voltage harmonic component corresponding to the at least one predetermined harmonic component on an input voltage sampling signal to generate a superimposition signal, wherein the voltage harmonic component has a same amplitude ratio as a corresponding harmonic component at the input port and has an opposite phase to the corresponding harmonic component, and multiplying the superimposition signal by a compensation signal to generate the current reference signal, wherein the input voltage sampling signal represents an input voltage of the switching-type regulator, the predetermined harmonic component is acquired based on the input voltage sampling signal, and the compensation signal represents a difference between a voltage reference signal and an output voltage; and
   b) multiplying at least one voltage harmonic component corresponding to the at least one predetermined harmonic component by the compensation signal respectively to generate at least one multiplied signal, wherein the voltage harmonic component has a same amplitude ratio as a corresponding harmonic component at the input port and has an opposite phase to the corresponding harmonic component, and superimposing all the at least one multiplied signal on a product signal of the input voltage sampling signal and the compensation signal to generate the current reference signal, wherein the input voltage sampling signal represents an input voltage of the switching-type regulator, the predetermined harmonic component is acquired based on the input voltage sampling signal, and the compensation signal represents the difference between the voltage reference signal and the output voltage.

7. The power factor correction circuit of claim 6, wherein the voltage harmonic component is obtained by acquiring a product signal of the predetermined harmonic component and the amplitude ratio corresponding to the predetermined harmonic component and then performing phase adjustment on the product signal.

8. The power factor correction circuit of claim 6, wherein the voltage harmonic component is obtained by performing phase adjustment on the predetermined harmonic component to generate a first signal, and then acquiring a product signal of the first signal and the amplitude ratio corresponding to the predetermined harmonic component.

9. The power factor correction circuit of claim 1, wherein each of the predetermined harmonic component is adjacent to a fundamental wave.

10. A method of controlling a switching-type regulator to perform power factor correction, the method comprising:
   a) measuring a total harmonic distortion (THD) and an amplitude ratio of each harmonic component at an input port;
   b) adjusting, based on the measured THD and the amplitude ratio of each harmonic component, a current reference signal of the switching-type regulator to minimize the THD; and
   c) wherein the current reference signal is adjusted by superimposing at least one predetermined harmonic component on the current reference signal, and wherein adjusting the current reference signal comprises adjusting, based on the measured THD, a phase of each of the predetermined harmonic components to minimize the THD.

11. The method of claim 10, further comprising at least one of:
   a) superimposing at least one voltage harmonic component corresponding to the at least one predetermined harmonic component on an input voltage sampling signal to generate a superimposition signal, wherein the voltage harmonic component has a same amplitude ratio as a corresponding harmonic component at the input port and has an opposite phase to the corresponding harmonic component, and multiplying the superimposition signal by a compensation signal to generate the current reference signal, wherein the input voltage sampling signal represents an input voltage of the switching-type regulator, and the predetermined harmonic component is acquired based on the input voltage sampling signal, and the compensation signal represents a difference between a voltage reference signal and an output voltage; and
   b) multiplying at least one voltage harmonic component corresponding to the at least one predetermined harmonic component by the compensation signal respectively to generate at least one multiplied signal, wherein the voltage harmonic component has a same amplitude ratio as a corresponding harmonic component at the input port and has an opposite phase to the corresponding harmonic component, and superimposing all the at least one multiplied signal on a product signal of the input voltage sampling signal and the compensation signal to generate the current reference signal, wherein the input voltage sampling signal represents an input voltage of the switching-type regulator, and the predetermined harmonic component is acquired based on the input voltage sampling signal, and the compensation signal represents the difference between the voltage reference signal and the output voltage.

12. A controller, comprising:
   a) a memory configured to store instructions; and
   b) a processor adapted to perform the method of claim 10 by executing said instructions.

13. The method of claim 10, wherein the amplitude ratio of the predetermined harmonic component is set based on the measured amplitude ratio of a corresponding harmonic component, and then the phase of the predetermined harmonic component is adjusted in a predetermined order until the measured THD is no longer decreased.

14. The method of claim 13, wherein the phase of the predetermined harmonic component is adjusted by progressively increasing the phase from zero until the measured THD is no longer decreased.

15. The method of claim 13, wherein phase partition is performed, a phase range where the phase of the predetermined harmonic component is located is determined, and the phase of the predetermined harmonic component is adjusted within the phase range until the measured THD is no longer decreased.

16. The method of claim 15, wherein a midpoint of the phase range where the phase of the harmonic component is located is determined as a reference point, whether a phase adjustment direction is a phase increasing direction or a phase decreasing direction is determined, and the phase of the predetermined harmonic component is adjusted based on the determined phase adjustment direction from the reference point until the measured THD is no longer decreased.

* * * * *